3,573,058
MICROCRYSTALLINE CELLULOSE COMPOSITIONS CO-DRIED WITH HYDROCOLLOIDS
Peter J. Tiemstra, La Grange, Ill., assignor to
Swift & Company, Chicago, Ill.
No Drawing. Filed Jan. 30, 1967, Ser. No. 612,329
Int. Cl. A23l 1/00
U.S. Cl. 99—1          8 Claims

ABSTRACT OF THE DISCLOSURE

Attrited microcrystalline cellulose is admixed and co-dried with a protective hydrocolloid such as gelatin, sodium alginate and the like. The hydrocolloid should be employed in an amount sufficient to produce a sediment less than about 20% (basis dry weight of microcrystalline cellulose employed) upon re-hydration of the co-dried product.

---

This invention relates to new and improved microcrystalline cellulose compositions and to a process for their preparation. More particularly, the invention relates to new and improved attrited microcrystalline cellulose compositions containing substantial amounts of a protective hydrocolloid, said compositions being capable of storage in dry form and subsequent hydration to form a semi-colloidal suspension without re-attriting the cellulose compositions.

The preparation and use of attrited microcrystalline cellulose has been described in U.S. Patent No. 3,023,104. It was disclosed therein that microocrystalline cellulose is the acid insoluble product obtained by the controlled acid hydrolysis of cellulose and is useful as a bulking agent and texture promoter in foods, particularly those of a dietetic nature.

In order to use microcrystalline cellulose satisfactorily in food preparations, it is necessary to prepare the attrited microcrystals in solution as semi-colloidal suspensions at the time of use. However, heretofore, when solutions of attrited microcrystalline cellulose were dried to facilitate storage they would not re-hydrate in the small crystalline form, and it was, therefore, necessary to re-attrite the material before use. This situation has given rise to a distinct problem in the storage of microcrystalline cellulose since it has heretofore been necessary to either store the material in solution, with the attendant problems of storage space and handling difficulties, or to store the material in its dry form and necessitate an additional attrition step before the microcrystalline cellulose could be hydrated to form the semicolloidal suspensions necessary for incorporating the material in food preparations. However, the latter procedure is not desirable since this attrition step is a time consuming and costly one requiring specialty equipment not found in every food processing plant. It is, therefore, to be recognized that it would be highly desirable and economically important to develop a procedure which would enable one to store the attrited microcrystalline cellulose in its dried form and to hydrate the material, without the necessity of an additional attrition step, to form the semi-colloidal suspensions required when the product is used in food preparations.

The present invention provides a composition and process for overcoming the above-mentioned problem. It has been found that when microcrystalline cellulose is co-dried with a substantial amount of a protective hydrocolloid that the dried product can be stored and subsequently hydrated to form the necessary semi-colloidal suspension without re-attriting the microcrystalline cellulose before hydration. The co-dried product has, also, been found to exhibit good keeping quality during storage prior to re-hydration.

It has heretofore been recognized that small amounts of protective hydrocolloid (from 0.1 to about 5% by weight of the food product) could be incorporated with the microcrystalline cellulose for the purpose of varying the texture or mouth feel of food products into which microcrystalline cellulose is incorporated. However, it has not previously been suggested that substantial amounts of protective hydrocolloid could be co-dried with the microcrystalline cellulose in order to solve the longstanding problem and to satisfy the long-felt need for a composition and process which would enable food processors to store dried, attrited microcrystalline cellulose and subsequently hydrate the material without an additional attrition step for use in preparing food products.

Accordingly, it is a principal object of the present invention to provide new microcrystalline cellulose compositions which can be utilized in a more efficient and economical manner than has heretofore been possible.

Another object of this invention is to provide a new composition comprising microcrystalline cellulose co-dried with a substantial amount of a protective hydrocolloid, said composition capable of being stored in its dried from and subsequently to be hydrated to form a semi-colloidal suspension for incorporation in food products without necessitating an additional attrition step.

It is a further object of this invention to provide a new process whereby a solution of microcrystalline cellulose which has been prepared by the usual prescribed manner and has been co-dried with a substantial amount of a protective hydrocolloid can be subsequently hydrated to obtain a semi-colloidal suspension of the microcrystals without necessitating an additional attrition step.

It is a still further object of the present invention to provide a new process for preparing attrited microcrystalline cellulose compositions containing a substantial amount of a protective hydrocolloid which can be stored and subsequently hydrated to form a semi-colloidal suspension for use in food preparations without necessitating an additional attrition step.

Additional objects, if not specifically set forth herein, will be apparent to one skilled in the art from the following description of the invention.

Generally, the present invention comprises admixing attrited microcrystalline cellulose prepared by the generally accepted procedure as described in U.S. Pat. No. 3,023,104, with an aqueous solution of a protective hydrocolloid. The cellulose-hydrocolloid suspension is then co-dried by any conventional method such as vacuum drying, freeze drying, spray drying, drum drying, drying by solvent displacement, air drying and the like. The resulting dried product can then be powdered and sized. It has been found that said dried, powdered product can be stored and exhibits good keeping quality during said storage and can be subsequently hydrated to form a semi-colloidal suspension which has thixotropic properties and which is suitable for use in preparing food products. Furthermore, the suspensions prepared from this dried product have been found to be equivalent to suspensions prepared from the original attrited microcrystalline cellulose which has not been dried. Therefore, the microcrystalline cellulose when co-dried with a protective hydrocolloid yields a product which can be stored in its dry form and subsequently used without adversely affecting its utility in food preparations.

Exemplary of suitable hydrocolloids which may be utilized in the process of the present invention are gelatin; carrageenin, tragacanth, arabic, ghatti and karaya gums; seaweed colloids such as agar, carrgeen and sodium alginate; seed extracts such as locust bean, quince and guar; starches and starch derivatives, like converted starches; water-dispersible cellulose derivatives such as sodium carboxymethyl cellulose; pectins such as apple pectin and citrus pectin; and, modified pectins such as low methoxy pectins and the like. Propylene glycol alginate is also useful.

The amount of said hydrocolloid to be admixed and co-dried with the microcrystalline cellulose is somewhat variable, it being understood that different hydrocolloids will usually have differing efficacies. In all cases, however, a substantial amount of hydrocolloid must be admixed with microcrystalline cellulose (greater than about 5%, basis dry weight of the mixture).

As will be shown in the following examples, when about 5%, and less, hydrocolloid (basis dry weight of the mixture) is admixed with microcrystalline cellulose, the co-dried product cannot practically be subsequently hydrated to form the desired semi-colloidal suspension since greater than about 20% of the microcrystalline cellulose will settle out as a coarse particulate sediment. This sediment would have to be re-attrited in order to provide a usable product. It will be recognized that such a large proportion of sediment would render the instant process impractical. From a practical and economic standpoint, the limit of tolerable sedimentation would appear to be about 20%, although it will be recognized that the lower the amount of sedimentation the better. It has been found that as the proportionate amount of hydrocolloid admixed with microcrystalline cellulose is increased above about 5% (basis dry weight of the mixture), the amount of sedimentation will decrease. A further finding has been that desirable products can be prepared when an amount of sodium alginate greater than about 8% (basis dry weight of the mixture) or an amount of gelatin greater than about 16⅔% (basis dry weight of the mixture) is admixed, as the hydrocolloid component, with microcrystalline cellulose and the mixture co-dried. In a preferred embodiment of the invention, equal parts of hydrocolloid and microcrystalline cellulose are admixed and co-dried. It has been found that when this 1:1 ratio is employed, a virtually complete redispersal of the cellulose in its microcrystalline form results upon hydration of the dried product and sedimentation is at a minimum.

The following examples are set forth for the purpose of illustration only and are not to be construed as being limitative in any respect.

EXAMPLE I

Microcrystalline cellulose (1,000 grams of a 36% cellulose paste) was slowly diluted with 1,400 grams of water in a Hobart mixer until a solution was obtained of much the same consistency as cream. This solution was heated to 150° F. and passed through a homogenizer at 1500 p.s.i. A gelatin solution (1,800 grams of a 10% gelatin solution) was added at a temperature of 145° F. This gave a ratio of two parts of microcrystalline cellulose to one part of gelatin. At this temperature, the admixture was homogenized at 1500 p.s.i. The resulting solution was poured into trays to a thickness of one-quarter inch, chilled to a firm gel, and placed on a net to dry at room temperature. The resulting dried product was ground in a hammer mill.

Another microcrystalline cellulose sample was prepared. Microcrystalline cellulose (1,000 grams of a 36% cellulose paste) was slowly diluted with 1,400 grams of water in a Hobart mixer until a solution was obtained of much the same consistency as cream. This solution was heated to 150° F. and passed through a homogenizer at 1500 p.s.i. This product was spread in a tray about one-quarter inch deep and air was passed over it until it was dry. The dried product was ground in a hammer mill.

A 10 gram portion of each of the above dried samples was re-hydrated in 50 ml. of water. The samples were allowed to stand for 5 minutes after having been stirred for 2 minutes. The sample co-dried with gelatin was re-hydrated as a milky suspended semi-colloidal solution whereas the other sample exhibited a very heavy sediment on the bottom with a slightly turbid solution above. These solutions were examined by Coulter counter technique to determine the average particle size. The average particle size of the re-hydrated co-dried material was 7 microns. This compared very favorably with the sample as originally prepared but before drying which had an average particle size of 6 microns. The re-hydrated microcrystalline cellulose dried without gelatin was too coarse to get an accurate reading.

EXAMPLE II

Microcrystalline cellulose (1,000 grams of a 36% cellulose paste) was slowly diluted with 1,400 grams of water in a Hobart mixer until a solution was obtained of much the same consistency as cream. This solution was heated to 150° F. and passed through a homogenizer at 1500 p.s.i. A gelatin solution (3,600 grams of a 10% gelating solution) was added at a temperature of 145° F. This gave a ratio of one part of microcrystalline cellulose to one part gelatin. At this temperature, the admixture was homogenized at 1500 p.s.i. A portion of the resulting solution was used for Coulter counter testing whereas the rest was poured in a shallow tray at a depth of one-quarter inch and dried. The dried material had a moisture content of 8.4%. The dried sheet was ground in a hammer mill. A 10 gram portion of this dried product was re-hydrated in 50 ml. of hot water. Upon subjection of this sample to Coulter counter testing, it was found that the average particle size was 8 microns which compared favorably with the sample as originally prepared but before drying which had an average particle size of 6 microns.

EXAMPLE III

Microcrystalline cellulose (1,000 grams of a 36% cellulose paste) was slowly diluted with 1,400 grams of water in a Hobart mixer until a solution was obtained of much the same consistency as cream. This solution was heated to 150° F. and passed through a homogenizer at 1500 p.s.i. A guar gum solution (18 kilograms of a 2% guar gum solution) was added. The mixture was heated to 180° F. and passed through a dual stage homogenizer at 2000 and 500 p.s.i. per stage, respectively.

The resulting suspension was spray dried to a moisture level of 3% and a bulk density of .46 gram per cubic centimeter. A 3½% solution of the resulting powder gave a milky pasty suspension similar to the original in body and flow properties and having no sediment.

EXAMPLE IV

A series of samples were prepared wherein attrited microcrystalline cellulose was admixed with various hydrocolloids in varying ratios of hydrocolloid to microcrystalline cellulose. These samples were each co-dried and then re-hydrated. The resulting sedimentation for each sample was recorded and the results are set forth in the following table:

TABLE I

| microcrystalline cellulose | Ratio hydrocolloid to microcrystalline cellulose | Percent hydrocolloid admixed | Sediment [1], percent |
|---|---|---|---|
| Gelatin | 1:2 | 33 | 5 |
| Do | 1:5 | 16⅔ | 20 |
| Sodium alginate | 1:5 | 16⅔ | 5 |
| Do | 1:20 | 5 | 25 |
| Locust Bean Gum | 1:5 | 16⅔ | 12 |
| Gum Arabic | 1:1 | 50 | 2 |
| Do | 1:3 | 25 | 10 |

[1] Approximate quantities expressed as percent based on the dry weight of the microcrystalline cellulose employed.

Obviously, many modifications and variations of the invention as hereinbefore set forth may be made without departing from the spirit and scope thereof, and, therefore, only such limitations should be imposed as are indicated in the appended claims.

I claim:
1. A process for preparing a dried, attrited microcrystalline cellulose composition capable of being stored in its dried form and subsequently to be hydrated without the necessity of a re-attriting step to form a semi-colloidal suspension comprising: admixing attrited microcrystalline cellulose with an aqueous solution of a protective hydrocolloid, passing said mixture through a homogenizer, drying the admixture, and grinding said admixture to prepare a powdered co-dried product, the amount of said hydrocolloid to be admixed being greater than 5% on a dry weight basis, said amount being sufficient to produce a sediment less than about 20% basis dry weight of microcrystalline cellulose employed upon re-hydration of said co-dried product.

2. The process of claim 1 wherein the hydrocolloid is a member selected from the group consisting of gelatin, sodium alginate, locust bean gum, gum arabic, and mixtures thereof.

3. The process of claim 1 wherein the amount of hydrocolloid to be employed is in a ratio of about one part hydrocolloid to about one part microcrystalline cellulose.

4. The process of claim 1 wherein gelatin in an amount of at least about 16⅔% basis dry weight of the mixture is employed as the hydrocolloid component.

5. The process of claim 1 wherein the hydrocolloid is sodium alginate, said sodium alginate being added in an amount of at least about 8% on a dry weight basis of the mixture.

6. The process of claim 1 wherein the hydrocolloid is locust bean gum.

7. The process of claim 1 wherein the hydrocolloid is gum arabic.

8. The process of claim 1 wherein the hydrocolloid is guar gum.

References Cited
UNITED STATES PATENTS

| | | | |
|---|---|---|---|
| 3,023,104 | 2/1962 | Battista | 99—1 |
| 3,297,806 | 1/1967 | Battista | 99—163 |

RAYMOND N. JONES, Primary Examiner

J. M. HUNTER, Assistant Examiner